United States Patent
Oswald et al.

(10) Patent No.: US 9,169,005 B2
(45) Date of Patent: Oct. 27, 2015

(54) DRIVE UNIT FOR AIRCRAFT RUNNING GEAR

(75) Inventors: Johann Oswald, Eschenlohe (DE); Manfred Heeg, Starnberg (DE)

(73) Assignee: L-3 Communications Magnet-Motor GmbH, Starnberg (DE)

(*) Notice: Subject to any disclaimer, the term of this patent is extended or adjusted under 35 U.S.C. 154(b) by 170 days.

(21) Appl. No.: 13/643,855

(22) PCT Filed: Apr. 28, 2010

(86) PCT No.: PCT/EP2010/055688
§ 371 (c)(1),
(2), (4) Date: Dec. 18, 2012

(87) PCT Pub. No.: WO2011/134503
PCT Pub. Date: Nov. 3, 2011

(65) Prior Publication Data
US 2013/0200210 A1  Aug. 8, 2013

(51) Int. Cl.
*B64C 25/40*  (2006.01)
(52) U.S. Cl.
CPC ............. *B64C 25/405* (2013.01); *Y02T 50/823* (2013.01)
(58) Field of Classification Search
CPC ...... B64C 25/405; B64C 13/34; B64C 25/50; Y02T 50/823; F16H 37/065
USPC ............................... 244/50, 102 R, 111, 99.9
See application file for complete search history.

(56) References Cited

U.S. PATENT DOCUMENTS

| | | | |
|---|---|---|---|
| 1,883,740 A * | 10/1932 | Irwin | 244/66 |
| 3,096,052 A | 7/1963 | Hardigan | |
| 3,279,722 A * | 10/1966 | Glover, Jr. et al. | 244/50 |
| 3,443,656 A * | 5/1969 | Stolz | 180/307 |
| 3,762,670 A * | 10/1973 | Chillson | 244/50 |
| 4,858,490 A * | 8/1989 | Grant | 74/661 |
| 6,843,750 B1 * | 1/2005 | Bennett | 475/273 |
| 7,445,178 B2 * | 11/2008 | McCoskey et al. | 244/50 |
| 8,444,086 B2 * | 5/2013 | Bucheton et al. | 244/111 |
| 2008/0142284 A1 * | 6/2008 | Qu et al. | 180/65.6 |
| 2009/0314884 A1 * | 12/2009 | Elliott et al. | 244/99.9 |
| 2010/0038478 A1 * | 2/2010 | Knight | 244/102 R |
| 2012/0153075 A1 * | 6/2012 | Wilson et al. | 244/50 |
| 2013/0249444 A1 * | 9/2013 | Golding | 318/8 |
| 2013/0264414 A1 * | 10/2013 | Ribarov et al. | 244/50 |
| 2014/0225421 A1 * | 8/2014 | Oswald et al. | 301/6.2 |
| 2014/0284421 A1 * | 9/2014 | Osman et al. | 244/50 |

FOREIGN PATENT DOCUMENTS

| | | |
|---|---|---|
| FR | 697180 | 6/1930 |
| GB | 2 210 833 | 6/1989 |
| JP | 3295796 | 12/1991 |

(Continued)

OTHER PUBLICATIONS

PCT Written Opinion of International Searching Authority, PCT/EP2010/055688, Filed Apr. 28, 2010, pp. 1-5.

*Primary Examiner* — Valentina Xavier
(74) *Attorney, Agent, or Firm* — Brinks Gilson & Lione

(57) ABSTRACT

A drive unit (16) for an aircraft running gear (2) having at least a first wheel (4) and a second wheel (6) on a common wheel axis (A) is characterized in that the drive unit (16) is drivingly coupleable to the first and second wheels (4, 6) such that a direction of longitudinal extension (C) of the drive unit (16) is in a plane orthogonal to the common wheel axis (A).

29 Claims, 6 Drawing Sheets

(56) References Cited

FOREIGN PATENT DOCUMENTS

| RU | 2384467 C2 | 3/2010 |
| --- | --- | --- |
| SU | 301039 A | 12/1988 |
| WO | WO 95/29094 | 11/1989 |
| WO | WO 2008/001013 A1 | 1/2008 |

* cited by examiner

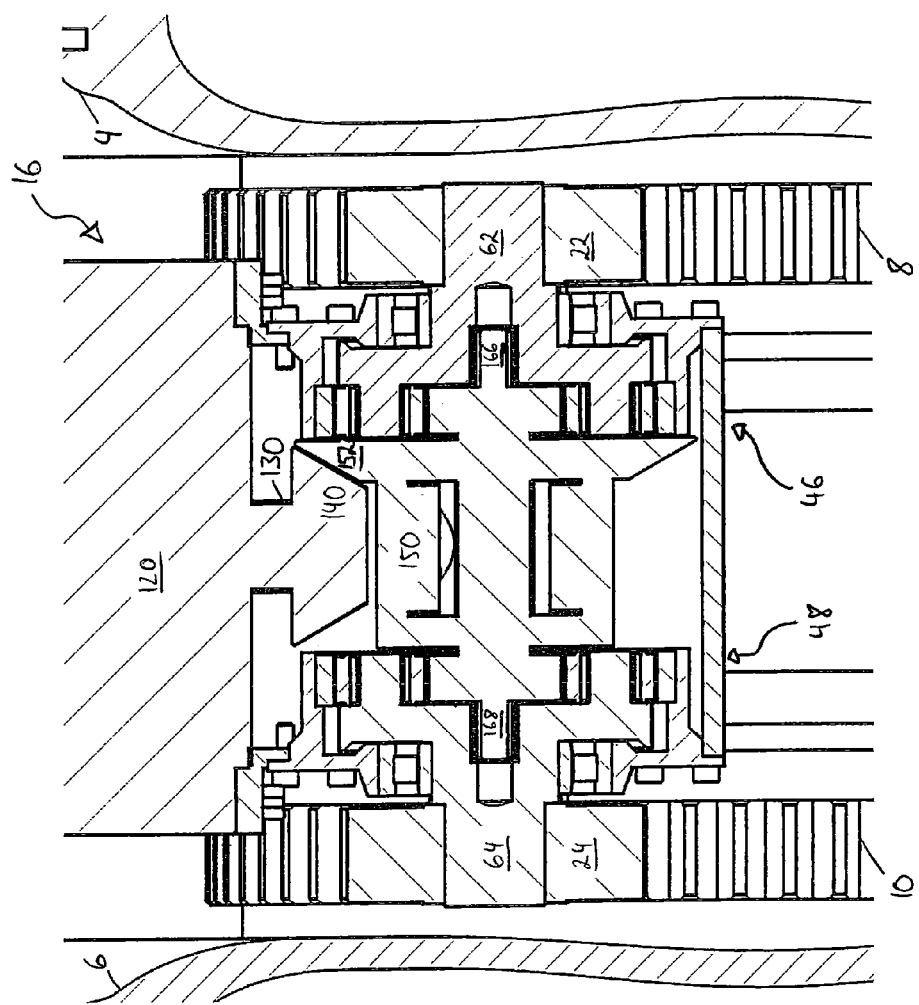

DRIVE UNIT FOR AIRCRAFT RUNNING GEAR

CROSS-REFERENCE TO RELATED APPLICATIONS

The present application claims the benefit under 35 U.S.C. §371 of International Patent Application No. PCT/EP2010/055688, having an international filing date of Apr. 28, 2010, the content of which is incorporated herein by reference in its entirety.

FIELD

The present invention is directed to a drive unit for an aircraft running gear and to an aircraft running gear comprising a drive unit.

BACKGROUND

Conventionally, large commercial aircraft, also referred to as airplanes hereinafter, use their gas turbine engines to taxi on an airfield or maneuvering area of an airport. As the gas turbine engines of airplanes are not designed to operate efficiently in a low power state, such as needed during the taxiing operation on the ground, maneuvering of the aircraft on the ground consumes a lot of fuel. Increasing fuel prices have made this fuel consumption during taxiing more and more worrisome. Moreover, the fuel efficiency for the whole flight decreases due to the large amount of fuel that has to be carried during the flight for taxiing at the destination airport. Alternatively, special vehicles are used to drag or push airplanes on an airfield. However, since such special vehicles are expensive themselves and not available in large numbers at most airports, they are commonly only used for short distances, such as the push-back operation from the gate. This again leads to the gas turbine engines being used for most of the taxiing, which causes above described disadvantages.

Alternative solutions for taxiing of aircraft have been suggested in the prior art. DE 10 2008 006 295 A1 discloses an electric motor mounted onto a running gear leg of an aircraft. The electric motor comprises a motor shaft parallel to the axis of the wheels of the running gear. The motor shaft can be moved axially between different positions in order to engage/disengage with the wheel structure of the aircraft running gear and drive the wheel.

WO 2009/086804 A1 discloses a motor for driving the wheels of an airplane landing gear, which is disposed in the base of the landing gear strut or is installed as a wheel hub motor in the wheel hub or rim.

Although improvements could be achieved with these approaches, it has been found that—especially for large commercial aircraft—these approaches did not yield satisfying results in terms of providing the necessary power to drive the aircraft without the help of the turbine engines, while making efficient use of the highly limited space available for such drives.

SUMMARY

Accordingly, the problem underlying the present invention is to provide a drive for an aircraft running gear that allows for providing the necessary power to taxi large commercial aircraft, such as common passenger aircraft, while imposing minimal space requirements to the overall design of the aircraft running gear.

This problem is solved by a drive unit in accordance with claim 1.

The claimed drive unit for an aircraft running gear having at least a first wheel and a second wheel on a common wheel axis is characterized in that the drive unit is drivingly coupleable to the first and second wheels such that a direction of longitudinal extension of the drive unit is in a plane orthogonal to the common wheel axis.

Providing the drive unit in such a way that its design requires it to be oriented in a plane orthogonal to the common wheel axis for operational coupling with the first and second wheels allows for a number of advantages. The motor(s) of the drive unit is/are no longer confined to the distance between the two wheels in its/their longitudinal direction. Without such a strict limit on the longitudinal extension of the motor(s), the speed and/or torque and/or speed torque product achieved by the motor(s) can be increased as compared to the prior art. Accordingly, more power for taxiing the aircraft can be generated by the motor(s). It is pointed out that the direction of longitudinal extension of the drive unit refers to the axis of the motor shaft of the motor comprised in the drive unit, which is also referred to as the longitudinal extension of the motor. Accordingly, the orientation of the motor allows for a more flexible length of the motor, such that improved motor characteristics can be realized. The particular orientation of the drive unit also allows for the distance between the first and the second wheel to be chosen more flexibly, since only the lateral dimension of the drive unit restricts this distance. A decreased distance between the first and second wheel may result in the overall space requirements for the wheel arrangement to be decreased, such that the whole aircraft running gear may be stowed in a more space-efficient manner during the flight. Commonly, the direction of longitudinal extension of the drive unit corresponds to the direction of the largest geometric extension of the drive unit.

The term common wheel axis refers to the geometrical axis running through the centers of the first and second wheels.

The plane orthogonal to the common wheel axis may be situated between the first and second wheel. In this way, the space between the first and second wheels may be used much more efficiently than in the prior art. The drive unit may be positioned substantially parallel to the running gear leg supporting the first and second wheels, e.g. in front of the running gear leg. Accordingly, a large portion of the drive unit lies within the space between the two wheels. The space between the two wheels refers to the total room enclosed by the projection of the circumference of the first wheel onto the circumference of the second wheel. This space is largely unused in prior art arrangements, but has to be accounted for when stowing the wheel arrangement during the flight. Accordingly, the invention allows for providing a more powerful, possibly larger motor than the prior art, while decreasing the space requirements through making it possible to reduce the distance between the wheels and to use the remaining space between the wheels efficiently.

According to a further embodiment, the drive unit comprises a first motor drivingly coupleable to the first wheel via a first gear structure and a second motor drivingly coupleable to the second wheel via a second gear structure, wherein the first and second motors are arranged in tandem along the direction of longitudinal extension of the drive unit. The arrangement in tandem refers to a one-behind-the-other arrangement in the direction of longitudinal extension of the drive unit. Providing a respective motor for driving each of the two wheels allows for the drive unit to be capable of driving the first and second wheels independently and to provide a desired wheel speed difference when the aircraft is turning a corner. For example, the running gear leg may be turned by a steering motor in order for the aircraft to steer to the right or to the left. The steering signal provided to the steering motor may also be provided to the first and second motors, such that these motors can drive the first and second wheel in accordance with the desired turning radius. Accordingly, a turning of the airplane is made possible that reduces the wear and tear of the tires and other components of the wheel arrangement. It is also possible to cause the turning of the aircraft by driving the first and second wheels at different speeds. The arrangement of the first and second motors in tandem allows for a space efficient positioning of the two motors, with the provision of two motors only adding to the longitudinal extension of the drive unit, but not to the lateral extension. Therefore, the provision of two motors does not have an impact on the distance between the first and second wheels required to accommodate the drive unit. Consequently, an improved driving of the first and second wheels is achieved, while ensuring a space-efficient arrangement of the whole aircraft running gear.

According to a further embodiment, the first motor in operation drives a first bevel gear, with the first bevel gear being drivingly coupleable to the first wheel via the first gear structure, and the second motor in operation drives a second bevel gear, with the second bevel gear being drivingly coupleable to the second wheel via the second gear structure. The first and second bevel gears allow for a change of the direction of the rotation axis of the components driven by the first and second motors. Particularly, the rotation of the shafts of the first and second motors can cause the rotation of other gear elements that are not aligned or parallel with the motor shafts and are comprised in the first and second gear structures, respectively. More particularly, a turning of the rotation axis of the driven components of 90° can be achieved. Accordingly, gear structure components whose rotation axis is identical with or parallel to the common wheel axis can be driven via the first and second bevel gears. This rotation can then be transmitted to the first and second wheels in a convenient manner.

According to a further embodiment, the first and second motors are arranged in a coaxial manner. This arrangement allows for a highly efficient use of space, as only one common axis of rotation is present in the drive unit, around which the first and second motors are arranged. The lateral extension of the drive unit can be kept to a minimum, because no two laterally offset motor shafts are required for driving the wheels.

According to a further embodiment, the first motor has a first motor shaft and the second motor has a second motor shaft, with the first motor shaft being hollow and being arranged around the second motor shaft. The arrangement of one hollow motor shaft around the other motor shaft ensures that the first and second motors can be arranged in a coaxial manner, while complete independence of the driving of the first and second wheels is achieved.

In a particular embodiment, the first and second motors are electric motors or hydraulic motors.

In a further embodiment, the first gear structure comprises a first gear element, having a third bevel gear and a first gear element shaft, and the second gear structure comprises a second gear element, having a fourth bevel gear and a second gear element shaft, with one of the first and second gear element shafts having a hollow portion and the other one of the first and second gear element shafts being supported in the hollow portion. The rotation axes of the first and second gear element shafts may be aligned. The supporting of one gear element shaft within the other allows for a highly compact and stable arrangement of the two independent power transmissions from the first motor to the first wheel and from the second motor to the second wheel. The first bevel gear may be in engagement with the third bevel gear, and the second bevel gear may be in engagement with the fourth bevel gear. In this way, a first gear ratio stage is realized. The gear ratio between the first and third bevel gears may be the same as the gear ration between the second and fourth bevel gears. The power generated by the first and second motors is transmitted via two coaxial motor shafts to two gear elements, which are aligned on a common axis, but are laterally displaced with respect to each other. A compact power transmission is achieved that provides—at its output—two laterally displaced gear elements with independent speeds of rotation. With one gear element supported within the other, the lateral dimension of the drive unit is kept to a minimum.

According to another embodiment, the drive unit comprises a motor and a differential gear, with the motor being drivingly coupleable to the first and second wheels via the differential gear. The provision of the differential gear allows for a mechanical adjustment of the wheel speeds when the aircraft is turning a corner. Accordingly, the two wheels can be driven with one motor, while the differential gear ensures the reduction of wear and tear on the tires and other wheel structure components by mechanically adjusting the wheel speeds to a given turning radius. The differential gear may be an integrated differential gear, meaning that it is integrated into a gearbox. The motor may comprise a bevel gear for engaging with the differential gear. In this way, an efficient rotation of the power transmission axis from the direction of longitudinal extension of the drive unit to a direction parallel or coaxial with the common wheel axis is achieved. The differential gear may be coupleable to the first and second wheels by first and second gear structures, respectively. Also, the differential gear may be a bevel differential or planetary differential or ball differential. The motor may be an electric motor or a hydraulic motor.

According to another embodiment, the drive unit comprises a first output stage gear engageable with a first wheel axis gear, which is coupled to the first wheel, for driving the first wheel, and a second output stage gear engageable with a second wheel axis gear, which is coupled to the second wheel, for driving the second wheel, wherein the first and second output stage gears are aligned on a common output stage axis, which is substantially orthogonal to the direction of longitudinal extension of the drive unit. The common output stage axis may be parallel to the common wheel axis. In this way, a drive unit may be provided that has two output stage gears, which may be circular external gears, that may simultaneously be brought into engagement with the two wheel axis gears coupled to the first and second wheels. The drive unit as a whole has above discussed advantages of having its direction of longitudinal extension in a plane orthogonal to the common wheel axis, while the provision of output stage gears orthogonal to the direction of longitudinal extension ensures that a straightforward selective engagement between the drive unit and the wheel structure can be realized. The combination of the first and second output stage gears and the first and second wheel axis gears, which may be circular external gears, also allows for establishing a gear ratio stage that is outside the drive unit. As the output stage gears may have a small diameter and the wheel axis gears may have a large diameter, a reduction gear stage having large transmission ratio can be achieved, which helps to produce sufficient torque using a compact motor. Accordingly, this gear ratio stage is in addition to all gear ratios that may be implemented within the drive unit, which helps in keeping the drive unit compact. It is pointed out that the term coupled, which is used with regard to the attachment between the first and second wheel axis gears and the first and second wheels, refers to a rotatably fixed attachment between these elements. It is intended to encompass all attachments that allow for a transfer of torque from the first and second output stage gears to the first and second wheel axis gears and ultimately to the first and second wheels, respectively. Arrangements that account for exceptional situations, such as the provision of a play in the rotatably fixed arrangement or an intended failure of the rotational fixation in case the torque exceeds a predetermined threshold, are intended to not be excluded by the term coupled.

In a further embodiment, the first and second gear structures comprise a planetary gear, respectively. The planetary gears allow for a reduction of the rotation speeds and an according increase of the torques in a very compact manner. With little space required, a gear ratio stage can be implemented in the drive unit via the planetary gears. Together with the gear ratio stage associated with the bevel gears and the gear ratio stage associated with the output stage gears and the wheel axis gears, three reduction stages may be realized in a very compact manner. The bevel gear stage allows for a 90° change of the rotation axis from the direction of the motor shaft(s) to a direction aligned with or parallel to the common wheel axis. The reduction stage at the drive unit output allows for a convenient implementation of a simultaneous engagement of the two output stage gears of the drive unit with the wheel axis gears coupled to the first and second wheels, respectively.

In a further embodiment, the first and second output stage gears are selectively engageable with the first and second wheel axis gears through moving the first and second output stage gears in a substantially radial direction of the first and second wheel axis gears. The term selective engagement refers to time-selective engagement. In other words, the output stage gears may be in engagement with the wheel axis gears at some points in time, whereas disengagement between the output stage gears and the wheel axis gears may be present at other points in time. Accordingly, selective engagement refers to a connection between two entities that can be in an engaged or in a disengaged state. Motion in a substantially radial direction of the first and second wheel axis gears means that, during the disengagement operation, the common output stage gear axis substantially stays in a radial motion plane defined by the common wheel axis and the common output stage axis in the engaged position.

The moving of the first and second output stage gears may be effected through pivotally rotating the drive unit or laterally displacing the drive unit. Inherently, the pivotally rotating of the drive unit prevents the common output stage axis from staying exactly in the radial motion plane. However, by choosing the distance between the engagement points (of the output stage gears and the wheel axis gears) and a pivot bearing, e.g. a pivotal mounting structure for attaching the drive unit to the running gear leg, to be comparatively large, the disengagement may be effected in an almost radial direction of the first and second wheel axis gears. Lateral displacement means that the drive unit is moved, with the motion not including any rotational component of the drive unit with respect to the remaining aircraft running gear. The radial engagement/disengagement direction allows for gentle engagement operations that keep the wear and tear of the first and second output stage gears and of the first and second wheel axis gears low. Typically, the common axis of the output stage gears remains parallel with the common axis of the wheel axis gears during engaging/disengaging of the gears, however the distance between these axes decreases/increases.

Particularly, the moving of the first and second output stage gears may correspond to a substantially straight motion of a respective tooth of the first and second output stage gears towards a respective engagement space between two respective teeth of the first and second wheel axis gears. The term straight motion is meant to describe a motion of the respective tooth along a line connecting the center of the wheel axis gear, the foot arch of the wheel axis gear, the tip arch of the output stage gear and the center of the output stage gear. Engaging refers to a motion of the tip arch of the output stage gear towards the foot arch of the wheel axis gear, whereas disengaging refers to a motion of the tip arch of the output stage gear away from the foot arch of the wheel axis gear and potentially passing the tip arch of the wheel axis gear. This sort of engaging motion allows for a minimization of wear and tear on the gear teeth. Of course, when both the output stage gears and the wheel axis gears are in rotational motion, the straight motion of the tooth towards the engagement space only takes place for an instance in time, with the adjacent tooth and space performing the straight motion the next instance.

The drive unit may also comprise an integrated free-wheel arrangement. A free-wheel arrangement prevents a rotation of the wheel axis gears to be transmitted to the motor(s) of the drive unit, even when the drive unit is in an engaged position. Accordingly, at one point in the power transmission path from the motor(s) to the output stage gears, a stage may be equipped with an overrunning clutch or the like that prevents power transmission from a downstream element to an upstream element, when looking at the normal operational power flow from the motor(s) to the wheels. Such a free-wheel arrangement allows the airplane to keep on rolling, should the motor(s) of the drive unit fail. The failed motor(s) cannot block the rotation of the wheels. Also, for the process of engaging the drive unit with the first and second wheel axis gears, the free-wheel arrangement ensures a synchronization of the wheel axis gear speeds with the output stage gear speeds, such that severe damage to the gears due to an unsynchronized engagement attempt can be prevented during the engaging operation. The free-wheel arrangement may be incorporated into any rotatably fixed coupling present in the gear arrangement described. For example, the coupling of the first and second output stage gears with respect to the first and second gear structures may have an integrated free-wheel arrangement. Alternatively, first and second ring gears of the first and second planetary gears may have an integrated free-wheel arrangement. The free-wheel arrangement may be realized mechanically. The free-wheeling direction of the free-wheel arrangement may be reversible. This allows for the advantages of the free-wheeling arrangement to be present both when driving the aircraft forward and backwards with the drive unit.

In a further embodiment, the drive unit comprises a self-securing engagement/disengagement mechanism. Such a self-securing engagement/disengagement mechanism prevents an inadvertent engagement of the drive unit with the wheel structure, which could result in unexpected behavior of the aircraft landing gear, which is potentially highly dangerous, especially during take-off and landing. The self-securing engagement/disengagement mechanism may comprise a bell crank. Also, the self-securing engagement/disengagement mechanism may be operated in a pneumatic, hydraulic or electric manner.

In a further embodiment, the drive unit comprises an engagement/disengagement mechanism adapted to synchronize the rotating speeds of the first and second output stage gears with the first and second wheel axis gears by sensing the wheel speed and adjusting the motor speed. Accordingly, a synchronized angular velocity of the first and second output stage gears and the first and second wheel axis gears can be reached, which allows for a precise engaging of these gears, such that the wear and tear of the gears can be kept low. The drive unit may comprise a control unit, which is in communication with a sensor measuring the wheel speed and generates control commands for the motor of the drive unit. In the case of two independent motors being provided for driving the first and second wheels, two sensors may be provided for measuring the wheel speeds and two control commands may be generated by the control unit to control the two motors independently.

In another embodiment, the drive unit may comprise a sensing device for sensing the relative positioning of gear teeth for targeted engaging of the first and second output stage gears with the first and second wheel axis gears, respectively. Using a direct measuring of the positions of gear teeth allows for a highly accurate engaging of the gears, as the variable that is decisive for the wear and tear of the gears, namely their relative positioning, is directly available for the control of the motor(s) of the drive unit. The rotational position of an output stage gear may be determined via a separate sensor, such as an incremental encoder, a resolver, or another positional sensor at the location of the output stage gear. In case the motor is an electric motor, it commonly comprises a positional sensor for determining the position of the motor, whose output may be used for determining the position of the output stage gear, with the determination taking the gearbox gear ratio into account. The position of the wheel axis gear may also be determined by a positional sensor that may be integrated into the running gear leg. The aircraft running gear may comprise an ABS breaking system, in which case an output of a positional sensor of the ABS breaking system may be used for determining the position of the wheel axis gear. The positional sensor for determining the position of the wheel axis gear may be mounted to the drive unit. The positional sensor may be an optical or inductive sensor measuring the distance to a tooth of the wheel axis gear or being triggered by the teeth of the wheel axis gear. The location of spaces between teeth can be determined very accurately in this way.

According to another embodiment, an aircraft running gear comprises at least a first wheel and a second wheel on a common wheel axis and a drive unit as described in any of the embodiments above. The aircraft running gear may comprise a first wheel axis gear, which is coupled to the first wheel, engageable to the first output stage gear of the drive unit, and a second wheel axis gear, which is coupled to the second wheel, engageable to the second output stage gear of the drive unit.

The aircraft running gear may also have a running gear leg supporting the first and second wheels, with the drive unit being mounted to the running gear leg. The wheels may be supported by the running gear leg via a wheel shaft assembly. The attachment to the running gear leg allows for a stable attachment of the drive unit to the aircraft running gear. The direction of longitudinal extension of the drive unit may be substantially parallel to the running gear leg. This arrangement allows for using the space between the first and second wheels for the positioning of the drive unit, such that an overall space-efficient aircraft running gear is formed. Particularly, the stowing space for the aircraft running gear during the flight is kept low. Also, the positioning of the drive unit in parallel to the running gear leg ensures that only minimal additional aerodynamic resistance is introduced by the drive unit.

In a further embodiment, the aircraft running gear is adapted to be used as a nose running gear or a main running gear. Also, the first and second wheel axis gears may be mounted on a respective rim of the first and second wheels. The first and second rims are very suitable structures for mounting the first and second wheel axis gears, as they are inherently stable structures that are adapted to carry the weight of the whole aircraft and that are designed to withstand extreme environmental conditions, during the flight as well as on the ground. The first and second wheel axis gears may be involute gears or cycloid gears or Wildhaber-Novikov gears or hypoid gears. Involute gears and cycloid gears may be particularly resistant to wear and tear in the detrimental environment of the aircraft running gear, where large amounts of dirt commonly accumulate. Wildhaber-Novikov gears may have a particularly high load bearing capacity. Particularly in combination with the radial engagement/disengagement of the gears, the Wildhaber-Novikov gears also allow for excellent durability of the wheel axis gears.

DRAWINGS

The invention is described in more detail below with regard to the exemplary embodiments shown in the accompanying Figures, in which:

FIG. 6 shows a cross-sectional view through an aircraft running gear according to a second exemplary embodiment of the invention.

DETAILED DESCRIPTION

Figure 1:
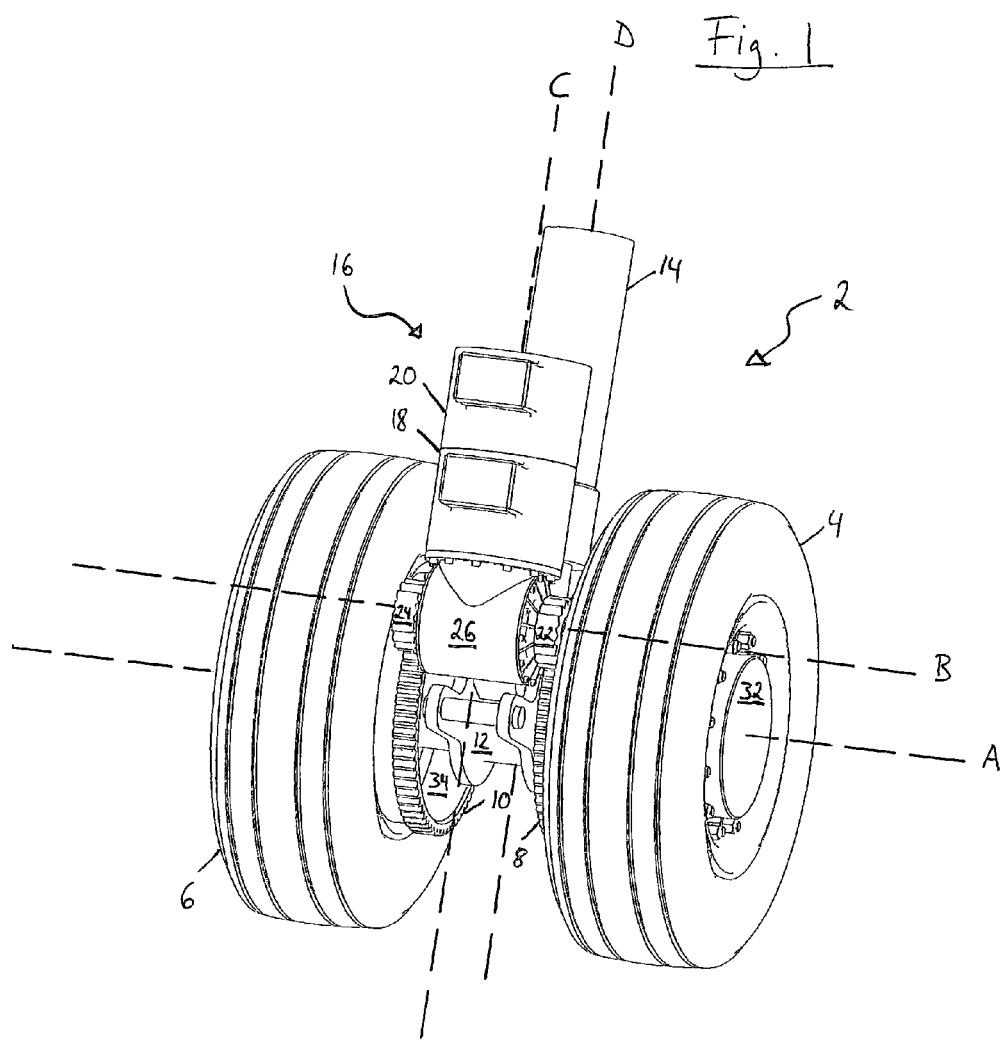
FIG. 1 shows a three-dimensional representation of an aircraft running gear according to a first exemplary embodiment of the invention.

FIG. 1 shows a three-dimensional representation of an aircraft running gear 2 according to a first exemplary embodiment of the present invention. The aircraft running gear 2 comprises a first wheel 4 and a second wheel 6, which are connected by a shaft assembly 12. The first and second wheels 4, 6 are aligned on a common wheel axis A in the geometrical sense. The first wheel 4 comprises a first rim 32, which is provided with a first wheel axis gear 8. The second wheel 6 comprises a second rim 34, which is provided with a second wheel axis gear 10. The first and second wheel axis gears 8, 10 can be mounted onto the first and second rims 32, 34 of the first and second wheels 4, 6 in any suitable manner that allows for a rotatably fixed attachment between the rims and the wheel axis gears. The rims and the wheel axis gears may also be made of one piece, respectively, i.e. the first rim 32 and the first wheel axis gear 8 may be made of one piece and the second rim 34 and the second wheel axis gear 10 may be made of one piece. In these ways, a fixed coupling between the first and second wheel axis gears 8, 10 and the first and second wheels 4, 6 is achieved, such that the rotational motion transmitted to the first and the second wheel axis gears 8, 10 is transmitted to the first and second wheels 4, 6. The first and second wheel axis gears 8, 10 are circular external gears, with their teeth being arranged straight between and perpendicular to the axial edges of the external gear.

The aircraft running gear 2 further comprises a running gear leg 14 running along a leg axis D and a drive unit 16, which is attached to the running gear leg 14. The drive unit 16 comprises a first motor 18 and a second motor 20, a gearbox 26, a first output stage gear 22 and a second output stage gear 24. The first and second motors 18, 20 are arranged along a common longitudinal axis C, also referred to as the direction of longitudinal extension of the drive unit 16. The first and second output stage gears 22, 24 are arranged along a common output stage axis B. The drive unit 16 is moveably mounted to the running gear leg 14, so that the first and second output stage gears 22, 24 can be selectively brought into engagement with the first and second wheel axis gears 8, 10. An engagement operation brings the first and second output stage gears 22, 24 simultaneously into engagement with the first and second wheel axis gears 8, 10. The first motor 18 is drivably coupled to the first output stage gear 22, and the second motor 20 is drivably coupled to the second output stage gear 24. In this way, the first and second wheels 4, 6 can be driven with different speeds by the first and second motor 18, 20, such that an aircraft that is equipped with the aircraft running gear 2 can easily turn corners in the airfield or maneuvering area of an airport. The gearbox 26 provides a gearbox gear ratio. Also, the output stage gears 22, 24 and the wheel axis gears 8, 10 provide an output gear ratio. The product of the gearbox gear ratio and the output stage gear ratio allows for a driving of large planes with two comparably very small motors that can be placed in front of the running gear leg 14 and extend into the space between the first and second wheels 4, 6. The gear ratios transform the high motor speeds of the first and second motors 18, 20 into large amounts of torque required for driving the aircraft during a taxiing operation.

In the exemplary embodiment shown in FIG. 1, the first and second motors 18, 20 are electric motors. However, the drive unit 16 can also be equipped with hydraulic motors.

Figure 2:
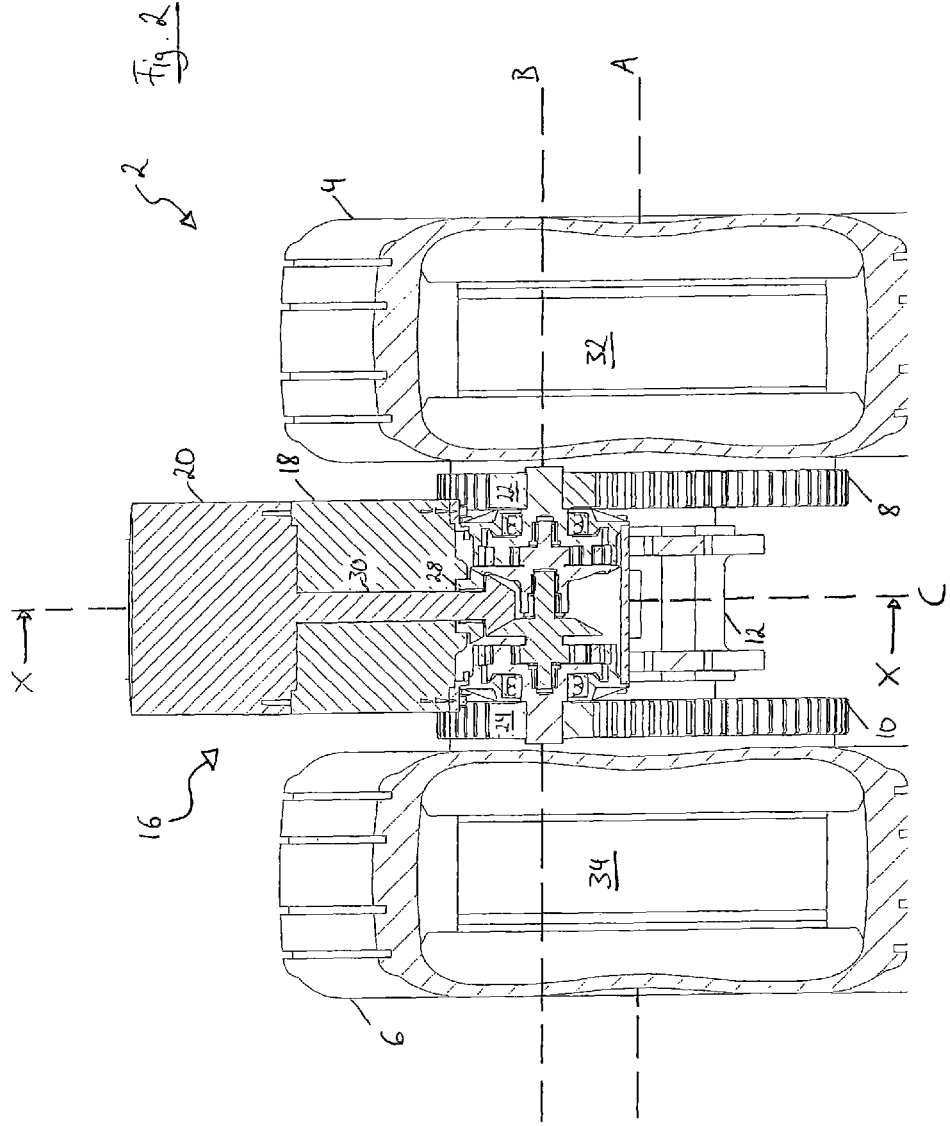
FIG. 2 shows a cross-sectional view through the aircraft running gear according to the first exemplary embodiment of the invention.

FIG. 2 is a cross-sectional view of the aircraft running gear 2 of FIG. 1. The cross-sectional plane is parallel to the wheel axis in front of the running gear leg 14. The output stage axis, on which the first and second output stage gears 22, 24 are aligned, lies within the cross-sectional plane, such that the drive unit 16 is cut in half along the longitudinal extension of the drive unit by the cross-sectional plane, i.e. the cross-section of FIG. 2 shows the interior of the drive unit 16. As the aircraft running gear 2 of FIG. 2 corresponds to the aircraft running gear of FIG. 1, like reference numerals are used for like elements. FIG. 2 illustrates well that the first and second wheel axis gears 8, 10 are mounted onto the first and second rims 32, 34.

The second motor 20 comprises a second motor shaft 30 that extends through the first motor 18. The first motor 18 comprises a first motor shaft 28 that is hollow and is arranged around the second motor shaft 30. In the exemplary embodiment shown in FIG. 2, the first motor shaft 28 extends along a small portion of the second motor shaft 30. The first and second motor 18, 20 are arranged in a coaxial manner, i.e. the center axes of the first motor shaft 28 and the second motor shaft 30 are identical and identical to the axis C defining the longitudinal extension of the first and second motors. Again, the term axis is used in its geometrical meaning.

The first motor 18 and the second motor 20 are arranged in tandem, i.e. they are arranged in a one behind the other relationship as seen from the gearbox or in an one above the other relationship as seen in the cross-sectional plane of FIG. 2. This viewing direction roughly corresponds to an observer's viewing direction when positioned in front of the aircraft running gear 2 of an aircraft. The coaxial arrangement of the first and second motors 18, 20 allows for the provision of two motors that are co-extensive along the longitudinal extension of the drive unit 16. In other words, the two motors extend substantially equally from their common axis in all directions orthogonal to the common axis, in particular in the lateral direction being defined as the direction of the common wheel axis.

Figure 3:
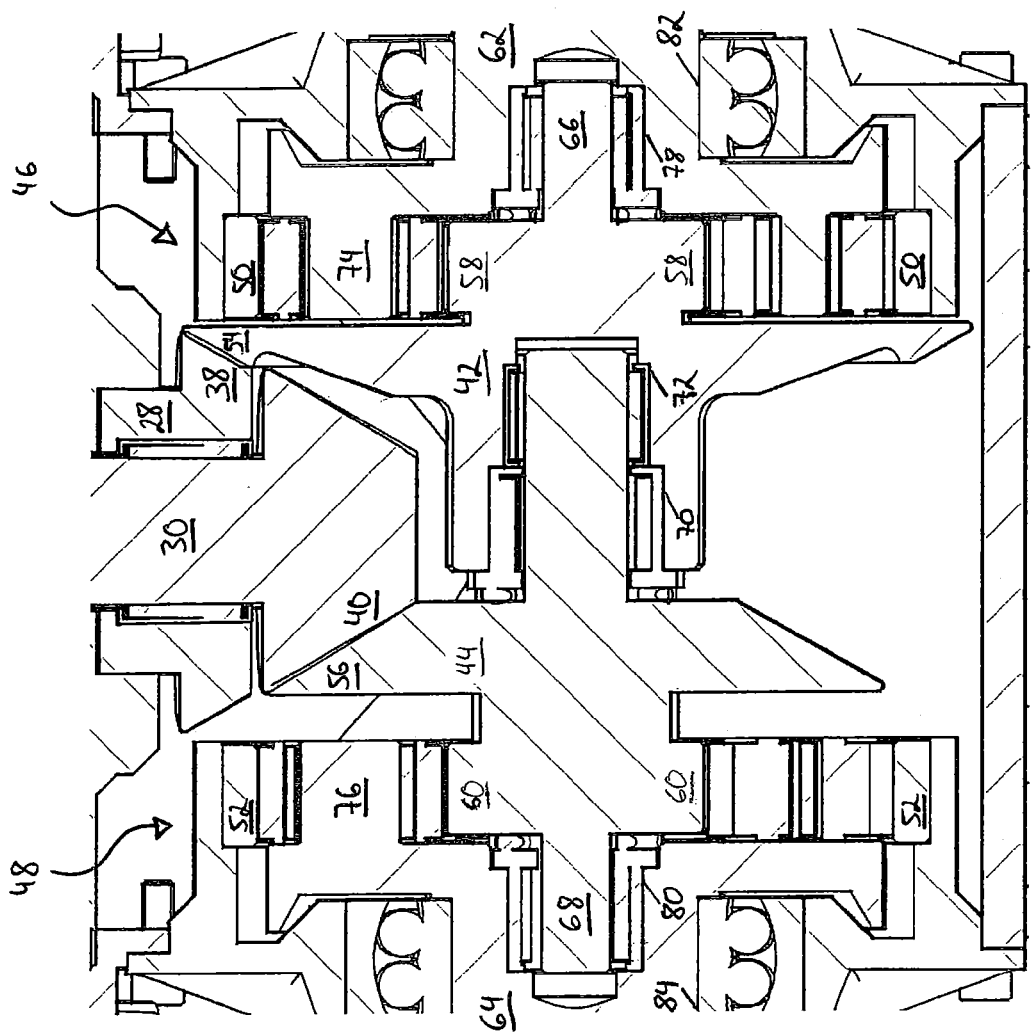
FIG. 3 shows an enlarged portion of the cross-sectional view shown in FIG. 2.

FIG. 3 is an enlarged version of the gearbox portion shown in the center of FIG. 2. FIG. 3 shows the first motor shaft 28 of the first motor 18 as well as the end portion of the second motor shaft 30 of the second motor 20. The first motor shaft 28 comprises a first bevel gear 38 at its end portion. The second motor shaft 30 comprises a second bevel gear 40 at its end portion. The gearbox 26 further comprises a first gear element 42 and a second gear element 44. The first gear element 42 comprises a third bevel gear 54, which is in engagement with the first bevel gear 38. The second gear element 44 comprises a fourth bevel gear 56, which is in engagement with the second bevel gear 40. The first gear element 42 further comprises a first gear element shaft 66, and the second gear element 44 comprises a second gear element shaft 68. The first gear element shaft 66 and the second gear element shaft 68 are aligned along a common axis. In the exemplary embodiment of FIG. 3, this axis of the first and second gear element shafts 66, 68 coincides with the output stage axis, on which the first and second output stage gears 22, 24 are aligned. The first and second gear element shafts respectively extend from a center portion of the gearbox 26 towards the first and second output stage gears 22, 24 arranged on the lateral ends of the gearbox 26, which can be best seen in FIG. 2. Through the first to fourth bevel gears, the rotation of the first and second motor shafts 28, 30 causes the rotation of the first and second gear elements 42, 44. In this manner, the rotation axis of the first and second gear elements 42, 44 is orthogonal to the rotation axis of the first and second motor shafts 28, 30.

The portion of the first gear element shaft 66 towards the center portion of the gearbox 26 is hollow. The portion of the second gear element shaft 68 towards the center portion of the gearbox 26 is supported within the first gear element shaft 66. This supporting of the second gear element shaft 68 within the first gear element shaft 66 allows for an accurate and stable alignment of the first and second gear element shafts 66, 68 and also of the first and second gear elements 42, 44 as a whole. The second gear element shaft 68 is supported within the first gear element shaft 66 by a first combined axial and radial bearing 70 and a radial bearing 72.

The gearbox 26 further comprises a first planetary gear 46 and a second planetary gear 48. It also comprises a third gear element 62 and a fourth gear element 64. The first planetary gear 46 couples the first gear element 42 to the third gear element 62, and the second planetary gear 48 couples the second gear element 44 to the fourth gear element 64.

The gearbox 26 comprises a first internal gear 50, which serves as the ring gear for the first planetary gear 46. The first gear element 42 comprises a first external gear portion 58, which serves as the sun gear of the first planetary gear 46. The third gear element 62 comprises a first plurality of planet gears 74. The first plurality of planet gears 74 are in engagement with the first internal gear 50 and the first external gear portion 58. In this way, the first external gear portion 58, the first plurality of planet gears 74 and the first internal gear 50 form the first planetary gear 46.

The gearbox 26 further comprises a second internal gear 52, which serves as the ring gear for the second planetary gear 48. The second gear element 44 comprises a second external gear portion 60, which serves as the sun gear of the second planetary gear 48. The fourth gear element 64 comprises a second plurality of planet gears 76. The second plurality of planet gears 76 are in engagement with the second internal gear 52 and the second external gear portion 60. In this way, the second external gear portion 60, the second plurality of planet gears 76 and the second internal gear 52 form the second planetary gear 48.

The outer portion of the first gear element shaft 66, i.e. the portion of the first gear element shaft 66 towards the first output stage gear 22, is supported within a recess of the third gear element 62 via a second combined axial and radial bearing 78. In this way, a stable alignment between the first gear element 42 and the third gear element 62 is achieved, which allows for a reliable functioning of the first planetary gear 46. The outer portion of the second gear element shaft 68, i.e. the portion of the second gear element shaft 68 towards the second output stage gear 24, is supported within a recess of the fourth gear element 64 via a third combined axial and radial bearing 80. In this way, a stable alignment between the second gear element 44 and the fourth gear element 64 is achieved, which allows for a reliable functioning of the second planetary gear 48.

The third gear element 62 is supported against the housing of the gearbox 26 via a fourth combined axial and radial bearing 82. Equally, the fourth gear element 64 is supported against the housing of the gearbox 26 via a fifth combined axial and radial bearing 84. The first output stage gear 22 is mounted to the third gear element 62, and the second output stage gear 24 is mounted to the fourth gear element 64. This mounting can be done in any suitable way that allows for a rotatably fixed connection between the third and fourth gear elements 62 and 64 and the first and second output stage gears 22, 24.

By supporting the first and second gear elements 42, 44 with respect to each other and by supporting the third and fourth gear elements 62, 62 with respect to the first and second gear elements 42, 44 and with respect to the housing of the gearbox 26, an alignment of the first through fourth gear elements 42, 44, 62, 64 is realized, which allows for a compact and stable gear structure for transmission of the rotational energy from the first and second motor shafts 28, 30 to the first and second output stage gears 22, 24. The described gear structure also allows for an independent drivable coupling of the first motor shaft 28 to the first output stage gear 22 and the second motor shaft 30 to the second output stage gear 24 in an extremely compact manner. This allows for placing the drive unit 16 in the highly space-critical environment of an aircraft running gear.

With regard to FIGS. 2 and 3, the overall gear ratio that is achieved by the exemplary gear structure is discussed. The described system comprises three reduction stages. The first reduction stage takes place between the first and second bevel gears 38, 40 and the third and fourth bevel gears 54, 56, respectively. The second reduction stage is realized by the first and second planetary gears 46, 48, respectively. The third reduction stage takes place between the first and second output stage gears 22, 24 and the first and second wheel axis gears 8, 10, respectively. The first and second reduction stages are embedded into the gearbox 26, whereas the third reduction stage is realized outside the gearbox through the engagement of the gearbox output stage with the gears associated with the first and second wheels 4, 6.

The selective driving of the first and second wheels 4, 6 by the drive unit 16 is achieved by selective engagement between the drive unit and the first and second wheel axis gears 8, 10. A mechanism of selective engagement is referred to as a mechanism that allows for engagement and disengagement of two elements, particularly of two gears. The point of engagement/disengagement, i.e. the point of selective engagement, lies behind the gearbox 26 in terms of the transmission direction of rotational energy. In other words, the first and second motor shafts 28, 30 are always in engagement with the gear arrangement within the gearbox 26, i.e. with the gear arrangement of the first and second reduction stages. The selective driving between the drive unit 16 and the first and second wheels 4, 6 is achieved via selective engagement on the output side of the drive unit.

In the exemplary embodiment described, the first reduction stage has a gear ratio of between 1.5 and 2.5. The second reduction stage has a gear ratio of between 3 and 4. The third reduction stage has a gear ratio of between 3.5 and 4.5. In this way, it is possible to drive an aircraft with a maximum take-off weight between 70,000 kg and 80,000 kg needing a torque of between 10,000 and 18,000 Nm at the nose wheel for taxiing by a single drive unit having a maximum torque of between 500 Nm and 600 Nm and a maximum speed of between 6,000 and 8,000 revolutions/min. It is explicitly stated that these numbers are of illustrative nature and are a mere example of the overall design of the drive unit and the aircraft running gear.

The drive unit allows for taxiing an aircraft without the help of the main turbines. These are used for starting, landing and flying the aircraft and can be switched off during the manoeuvring on the airfield in the presence of the drive unit described above. The power for operating the drive unit may be provided by an auxiliary power unit commonly present in modern aircrafts. The auxiliary power unit is a gas turbine engine smaller than the main turbines. It is commonly run before takeoff for supplying the airplane with electrical energy, for example for operating the cabin air conditioning, the passenger entertainment systems and other airplane appliances. The auxiliary power unit can be adapted to provide electrical energy and/or hydraulic pressure for a hydraulic motor. Alternatively, there can be a separate power source for the drive unit, for example a fuel cell or a rechargeable battery.

Figure 4:
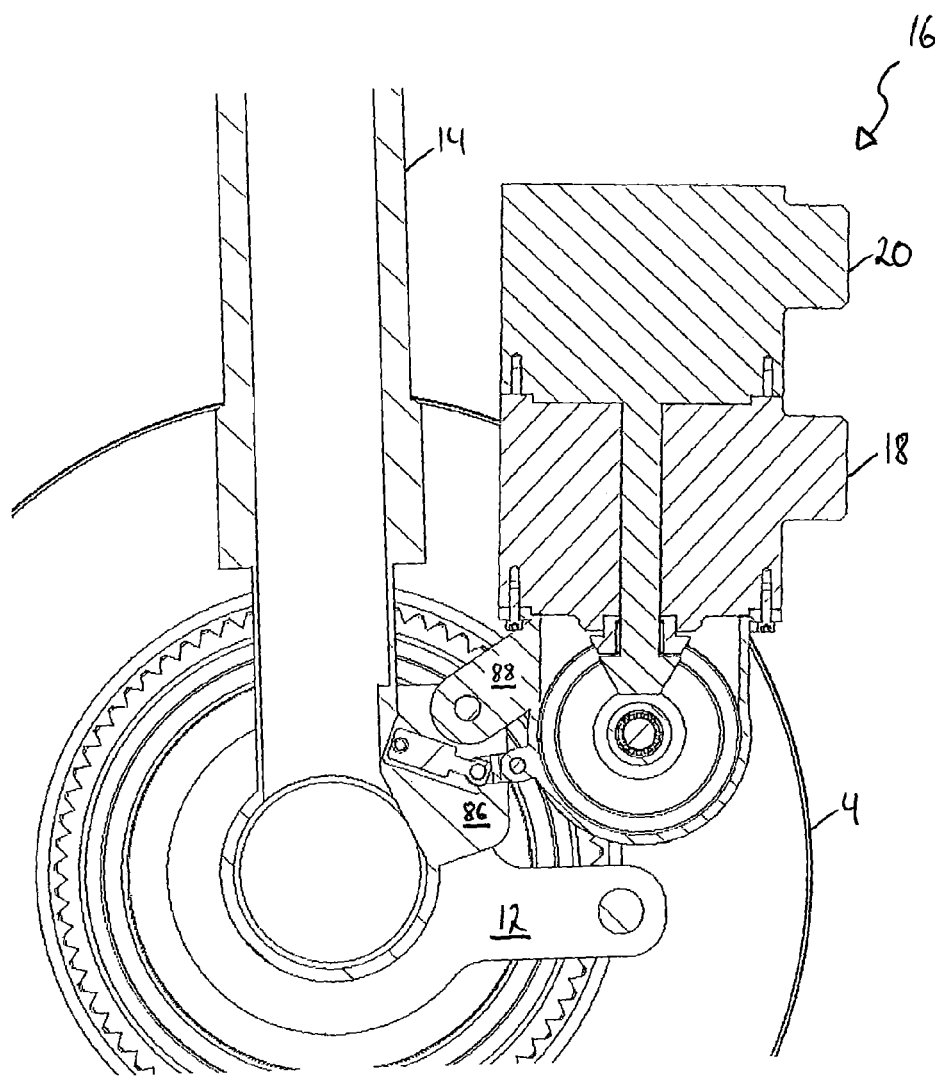
FIG. 4 shows a further cross-sectional view through the aircraft running gear according to the first exemplary embodiment of the invention.

FIG. 4 is a further cross-sectional view of the aircraft running gear 2 depicted in FIGS. 1 and 2. The cross-sectional plane is orthogonal to the wheel axis and cuts the wheel axis and the running gear leg at substantially their center portions. The cross-sectional plane of FIG. 4 is marked in FIG. 2, with the viewing direction indicated by arrows X-X. FIG. 4 shows that the direction of longitudinal extension of the drive unit lies within a plane orthogonal to the common wheel axis A.

FIG. 4 shows the drive unit 16 in an engaged position with the first and second wheel axis gears 8, 10. More particularly, the first and second output stage gears 22, 24 are in engagement with the first and second wheel axis gears 8, 10, such that the first and second motors 18, 20 are driveably coupled to the first and second wheels 4, 6, respectively. The longitudinal extension of the drive unit 16 is substantially parallel to the running gear leg 14 in the engaged position.

The mounting of the drive unit 16 to the running gear leg 14 is described in more detail. The drive unit 16 comprises a mounting arm 88. The running gear leg 14 comprises a supporting portion 86 for mounting the drive unit 16. The supporting portion 86 and the mounting arm 88 are connected in a manner that allows for a rotation of the drive unit 16 with regard to the running gear leg 14. In other words, a pivot connection is established between the supporting portion 86 and the mounting arm 88. In the exemplary embodiment of FIG. 4, the mounting arm 88 is provided with a hole for receiving a mounting bolt, screw, rod, or the like. The supporting portion 86 has a recess for receiving the mounting arm 88 of the drive unit, with a plate being provided at each outer side of the recess of the supporting portion, one of which being shown in the cross-sectional view of FIG. 4. The two plates of the supporting portion 86 comprise a hole, which is aligned with the hole provided in the mounting arm 88, such that the bolt, screw, rod, or the like mentioned above, is positioned in a way extending through the hole provided in the mounting arm 88 and the holes provided in the supporting portion 86. In this way, the supporting portion 86 and the mounting arm 88 are connected, with the center axis of the bolt, screw, rod, or the like being the pivoting axis for the rotation of the drive unit 16 with respect to the running gear leg 14.

Figure 5B:
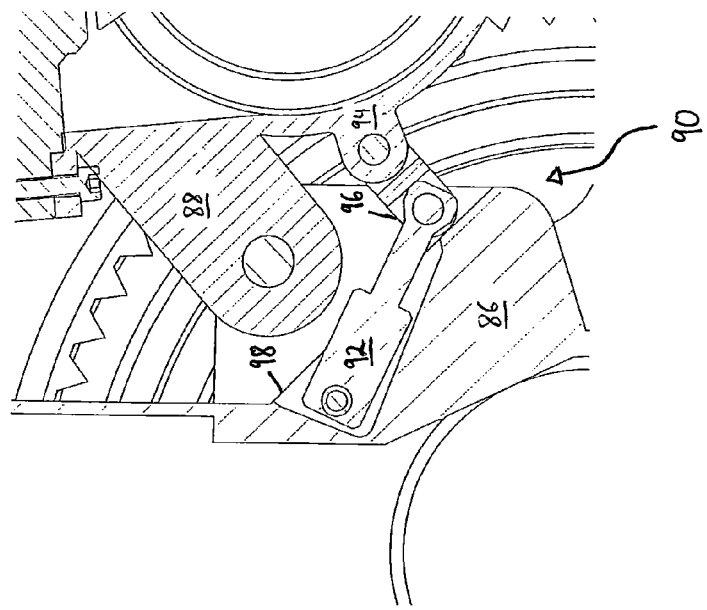
FIG. 5b shows the enlarged portion shown in FIG. 5a, with the drive unit being in a disengaged position.
Figure 5A:
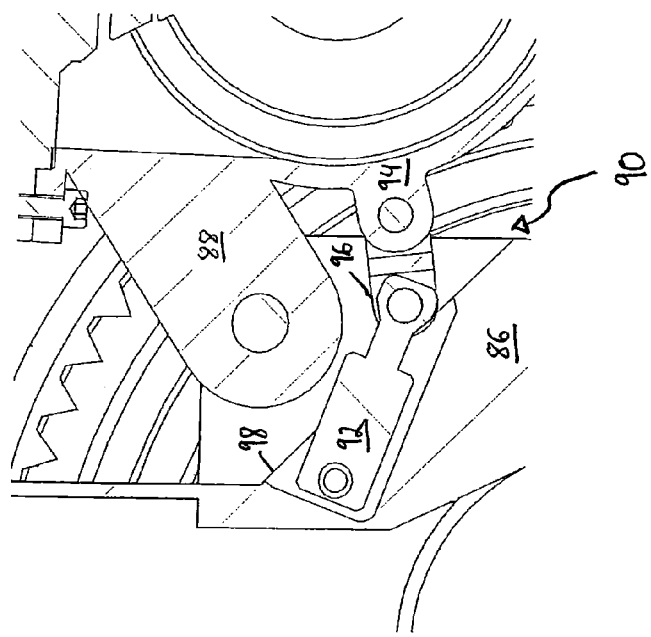
FIG. 5a shows an enlarged portion of the cross-sectional view shown in FIG. 4.

FIG. 5a is an enlarged version of the mounting arrangement between the drive unit 16 and the running gear leg 14 shown in FIG. 4. FIG. 5b shows the enlarged version of the mounting arrangement of FIG. 5a, with the drive unit 16 being in a disengaged position with respect to the first and second wheel axis gears 8, 10.

The drive unit 16 comprises an engagement/disengagement mechanism 90. The drive unit further comprises an engagement control arm 94, to which the engagement/disengagement mechanism 90 is coupled, for example by a bolt, screw, rod, or the like. The engagement/disengagement mechanism 90 comprises a bell crank having an actuator 92 and a connection element 96. The actuator 92 and the connection element 96 are connected in a way that allows rotation with respect to each other, for example by a bolt, screw, rod, or the like. The connection element 96 is the portion of the engagement/disengagement mechanism 90 that is connected to the engagement control arm 94. The actuator 92 is fixed to the supporting portion 86 at its one end. Its other end comprises the connection to the connection element 96. The actuator 92 has a variable length in its longitudinal extension between the one end fixed to the supporting portion 86 and the other end connected to the connection element 96. Varying the length of the actuator 92 results in the connection between the actuator 92 and the connection element 96 to be displaced along a bottom plane 98 of the recess of the supporting portion 86 provided for receiving the mounting arm 88 of the drive unit 16. This results in an according motion of the connection element 96, the engagement control arm 94 and the drive unit 16. The actuator 92 may be an electric, hydraulic or pneumatic actuator. The operation of the actuator 92 results in a change of the length of the actuator 92, which may be achieved by providing a piston slidingly positioned in the actuator 92.

In FIG. 5a, the drive unit 16 is shown in a position of engagement with the first and second wheel axis gears. In the engagement position, the length of the actuator 92 is minimal. The connection element 96 is drawn towards the running gear leg 14, which in turn pulls the engagement control arm 94 towards the running gear leg 14. This in turn pulls the lower portion of the drive unit 16, i.e. the part of the drive unit 16 below the mounting arm 88, towards the running gear leg 16. This results in the first and second output stage gears engaging with the first and second wheel axis gears.

In FIG. 5b, the drive unit 16 is shown in a position of disengagement with respect to the first and second wheel axis gears. As compared to FIG. 5a, the actuator 92 is extended in length. This results in the connection between the actuator 92 and the connection element 96 to be moved away from the running gear leg 14 and down the bottom plane 98 of the recess of the supporting portion 86, as compared to the positioning of FIG. 5a. The connection element 96 is also in a position further removed from the running gear leg 14, which results in the engagement control arm 94 of the drive unit to be further away from the running gear leg 14 as well, such that the drive unit 16 is disengaged with respect to the first and second wheel axis gears. Accordingly, the length of the actuator 92 determines if a state of engagement or disengagement is present. Accordingly, the drive unit 16 can be engaged/disengaged by varying the length of the actuator 92.

The actuator 92 and the connection element 96 form a bell crank, which allows for the engagement/disengagement mechanism 90 to be self-securing, which will be discussed as follows. In the disengagement position, shown in FIG. 5b, the orientation of the connection element 96 is substantially perpendicular to the bottom plane 98. The weight of the drive unit 16 is partially supported by the mounting arm 88 and partially by the connection element 96. Through the connection element 96, a force normal to the bottom plane 98 is exerted onto the supporting portion 86. With the force being normal to the bottom plane 98, no force for moving the connection between the actuator 92 and the connection element 96 along the bottom plane 98 is caused by the drive unit's weight in the disengagement position. Thus, in the disengagement position, no force needs to be provided by the actuator to keep the drive unit 16 disengaged. Accordingly, should the actuator fail while the drive unit is disengaged, there is no danger of the drive unit 16 inadvertently engaging with the first and second wheel axis gears. An active operation by the actuator 92 is required to bring the drive unit 16 and the wheel structure into engagement. Hence, no damage can be caused to the drive unit 16 or the wheel structure through an unwanted engagement, for example during the landing of the aircraft, when the wheels rotate at high speeds due to the airplane's landing speed. Also, it is ensured that the drive unit 16 is no safety hazard, as an unwanted engagement during take-off or landing could have severe consequences. Therefore, the engagement/disengagement mechanism 90 is considered self-securing.

FIG. 6 shows a portion of an aircraft running gear 2 in accordance with a second embodiment of the invention. To a large extent, the second embodiment of FIG. 6 corresponds to the first embodiment shown in FIGS. 1 through 5, such that like elements are denoted with like reference numerals. A description of like elements if omitted for brevity. However, the drive unit 16 of the second embodiment of the aircraft running gear 2 shown in FIG. 6 is designed partially differently. The drive unit 16 of FIG. 6 only has one motor 120. The motor 120 comprises a motor shaft 130, which comprises a bevel gear 140. The bevel gear 140 is in engagement with a bevel gear 152 of a differential gear 150. The differential gear 150 is coupled to the third and fourth gear elements, as described with respect to FIG. 3, via first and second planetary gears 46, 48, respectively, as also described with respect to FIG. 3. The differential gear 150 comprises a first shaft portion 166 and a second shaft portion 168. The first shaft portion 166 is supported within the recess of the third gear element 62, described with respect to FIG. 3. The second shaft portion 168 is supported within the recess of the fourth gear element 64, described with respect to FIG. 3. Through the supporting of the first and second shaft portions 166, 168 within the third and fourth gear elements 62, 64, a stable alignment between the differential gear 150 and the third and fourth gear elements 62, 64 is achieved.

The differential gear 150 allows for the third and fourth gear elements 62, 64 to be rotated at different speeds. This in turn allows for a rotation of the first and second output stage gears 62, 64 as well as the first and second wheels 4, 6 at different speeds as well. The differential gear has the innate property that it adjusts the relative speeds of its two outputs, i.e. of the first and second differential gear shafts 166, 168, according to the resistance experienced at the outputs. This allows for the outer wheel to be driven faster than the inner wheel during a turning maneuver. Accordingly, when the airplane, whose running gear is equipped with the drive unit 16 of FIG. 6, turns on an airfield, the differential gear 150 ensures that the first and second wheels rotate with their respective speeds according to the desired turning radius. Accordingly, the low wear and tear of the tires and the whole wheel structure that can be achieved through the provision of two motors, as described with reference to the first embodiment (FIGS. 1 through 5), can also be achieved by providing the differential gear 150. However, the motor 120 has to provide twice as much power as each of the first and second motors 18, 20 of the first embodiment to achieve the same driving capability for the first and second wheels 4, 6.

The invention claimed is:

1. A drive unit for an aircraft running gear having a running gear leg and at least a first wheel and a second wheel on a common wheel axis,
characterized in that the drive unit is drivingly coupleable to the first and second wheels such that a direction of longitudinal extension of the drive unit is in a plane orthogonal to the common wheel axis and substantially parallel to a main longitudinal axis of the running gear leg, and
further characterized in that the drive unit comprises:
a first motor drivingly coupleable to the first wheel via a first gear structure, and
a second motor drivingly coupleable to the second wheel via a second gear structure,
wherein the first and second motors are arranged in tandem along the direction of longitudinal extension of the drive unit.

2. The drive unit according to claim 1, wherein:
the first motor in operation drives a first bevel gear, with the first bevel gear being drivingly coupleable to the first wheel via the first gear structure, and
the second motor in operation drives a second bevel gear, with the second bevel gear being drivingly coupleable to the second wheel via the second gear structure.

3. The drive unit according to claim 1, wherein the first and second motors are arranged in a coaxial manner.

4. The drive unit according to claim 1, wherein the first motor has a first motor shaft and the second motor has a second motor shaft, with the first motor shaft being hollow and being arranged around the second motor shaft.

5. The drive unit according to claim 1, wherein the first and second motors are electric motors or hydraulic motors.

6. The drive unit according to claim 2, wherein
the first gear structure comprises a first gear element having a third bevel gear and a first gear element shaft and the second gear structure comprises a second gear element having a fourth bevel gear and a second gear element shaft, with one of the first and second gear element shafts having a hollow portion and the other one of the first and second gear element shafts being supported in the hollow portion.

7. The drive unit according to claim 1, comprising:
a motor and a differential gear, with the motor being drivingly coupleable to the first and second wheels via the differential gear.

8. The drive unit according to claim 7, wherein the motor comprises a bevel gear for engaging with the differential gear.

9. The drive unit according to claim 7, wherein the differential gear is coupleable to the first and second wheels by first and second gear structures, respectively.

10. The drive unit according to claim 7, wherein the differential gear is a bevel differential or planetary differential or ball differential.

11. The drive unit according to claim 7, wherein the motor is an electric motor or a hydraulic motor.

12. The drive unit according to claim 1, further comprising:
a first output stage gear engageable with a first wheel axis gear, which is coupled to the first wheel, for driving the first wheel, and
a second output stage gear engageable with a second wheel axis gear, which is coupled to the second wheel, for driving the second wheel,
wherein the first and second output stage gears are aligned on a common output stage axis, which is substantially orthogonal to the direction of longitudinal extension of the drive unit.

13. The drive unit according to claim 1, wherein the first and second gear structures comprise a planetary gear, respectively.

14. The drive unit according to claim 12, wherein the first and second output stage gears are selectively engageable with the first and second wheel axis gears through moving the first and second output stage gears in a substantially radial direction of the first and second wheel axis gears.

15. The drive unit according to claim 14, wherein the moving of the first and second output stage gears corresponds to a substantially straight motion of a respective tooth of the first and second output stage gears towards a respective engagement space between two respective teeth of the first and second wheel axis gears.

16. The drive unit according to claim 14, wherein the moving of the first and second output stage gears is effected through pivotally rotating the drive unit or laterally displacing the drive unit.

17. The drive unit according to claim 1, further comprising an integrated free-wheel arrangement.

18. The drive unit according to claim 17, wherein a free-wheeling direction of the free-wheel arrangement is reversible.

19. The drive unit according to claim 1, comprising a self-securing engagement/disengagement mechanism.

20. The drive unit according to claim 19, wherein the self-securing engagement/disengagement mechanism comprises a bell crank.

21. The drive unit according to claim 19, wherein the self-securing engagement/disengagement mechanism is operated in a pneumatic, hydraulic or electric manner.

22. The drive unit according to claim 12, comprising an engagement/disengagement mechanism adapted to synchronize the rotating speeds of the first and second output stage gears with the first and second wheel axis gears by sensing the wheel speed and adjusting the motor speed.

23. The drive unit according to claim 22, comprising a sensing device for sensing the relative positioning of gear teeth for targeted engaging of the first and second output stage gears with the first and second wheel axis gears, respectively.

24. An aircraft running gear, comprising:
a running gear leg,
at least a first wheel and a second wheel on a common wheel axis, and
a drive unit that is drivingly coupleable to the first and second wheels such that a direction of longitudinal extension of the drive unit is in a plane orthogonal to the common wheel axis and substantially parallel to a main longitudinal axis of the running gear leg, wherein the drive unit comprises:
a first motor drivingly coupleable to the first wheel via a first gear structure, and
a second motor drivingly coupleable to the second wheel via a second gear structure,
wherein the first and second motors are arranged in tandem along the direction of longitudinal extension of the drive unit.

25. The aircraft running gear according to claim 24, comprising:
a first wheel axis gear, which is coupled to the first wheel, engageable to the first output stage gear of the drive unit, and
a second wheel axis gear, which is coupled to the second wheel, engageable to the second output stage gear of the drive unit.

26. The aircraft running gear according to claim 24, wherein the running gear leg supports the first and second wheels, and the drive unit is mounted to the running gear leg.

27. The aircraft running gear according to claim 24 adapted to be used as a nose running gear or a main running gear.

28. The aircraft running gear according to claim 24, wherein the first and second wheel axis gears are mounted on a respective rim of the first and second wheels.

29. The aircraft running gear according to claim 24, wherein the first and second wheel axis gears are involute gears or cycloid gears or Wildhaber-Novikov gears or hypoid gears.

* * * * *